United States Patent
Bollin

(10) Patent No.: US 7,971,420 B1
(45) Date of Patent: Jul. 5, 2011

(54) DRAPER PLATFORM SUSPENSION

(75) Inventor: Douglas John Bollin, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/872,707

(22) Filed: Aug. 31, 2010

(51) Int. Cl.
*A01D 67/00* (2006.01)
(52) U.S. Cl. .................................................. 56/208
(58) Field of Classification Search ............ 56/208, 56/364, 10.2 E, DIG. 15
See application file for complete search history.

(56) References Cited

U.S. PATENT DOCUMENTS

| | | | | |
|---|---|---|---|---|
| 3,908,345 | A * | 9/1975 | Oni et al. ................... | 56/208 |
| 4,136,508 | A * | 1/1979 | Coleman et al. ............ | 56/208 |
| 4,171,606 | A * | 10/1979 | Ziegler et al. ............ | 56/10.2 E |
| 4,206,582 | A * | 6/1980 | Molzahn et al. ............ | 56/15.8 |
| 4,414,792 | A * | 11/1983 | Bettencourt et al. ....... | 56/10.2 E |
| 4,567,719 | A * | 2/1986 | Soots et al. ................ | 56/364 |
| 4,724,661 | A * | 2/1988 | Blakeslee et al. ........... | 56/208 |
| 5,237,802 | A * | 8/1993 | Fachini et al. ............ | 56/10.2 E |
| 5,359,836 | A * | 11/1994 | Zeuner et al. ............ | 56/10.2 E |
| 5,415,586 | A * | 5/1995 | Hanson et al. ................ | 460/8 |
| 5,704,200 | A * | 1/1998 | Chmielewski, Jr. et al. .......................... | 56/10.2 E |
| 6,758,029 | B2 * | 7/2004 | Beaujot .................... | 56/10.2 E |
| 6,789,379 | B2 * | 9/2004 | Heidjann et al. ........... | 56/10.2 E |
| 6,843,046 | B2 * | 1/2005 | Heidjann et al. ............ | 56/208 |
| 6,945,548 | B2 * | 9/2005 | Dudding et al. ........ | 280/124.157 |
| 7,661,251 | B1 * | 2/2010 | Sloan et al. .............. | 56/10.2 E |
| 2007/0000226 | A1 * | 1/2007 | Grywacheski et al. ......... | 56/364 |

* cited by examiner

Primary Examiner — Árpád Fábián-Kovács

(57) ABSTRACT

A draper platform (102) with an elongate, laterally extending frame (110), has a suspension system has two independent hydraulic circuits (502, 504), that can be independently filled and emptied to selectively lift the left side and the right side of the draper platform (102). Two hydraulic cylinders (306, 406) are disposed on the left side of the draper platform (102) in fluid communication with a gas-charged accumulator (506) to form the first hydraulic circuit (502), and to support the draper platform (102) on a gauge wheel (218) and the left side of a feederhouse (104). Two additional hydraulic cylinders (510, 512 are disposed on the right side of the draper platform (102) in fluid communication with the second gas-charged accumulator (514) to form the second hydraulic circuit (504), and to support the draper platform (102) on a gauge wheel (220) and the right side of the feederhouse (104). Valves (518, 520) control flow to the first and second hydraulic circuits (502, 504), respectively, to permit an electronic control circuit (500) to separately and independently fill and empty the first and second hydraulic circuits (502, 504).

7 Claims, 4 Drawing Sheets

DRAPER PLATFORM SUSPENSION

FIELD OF THE INVENTION

The invention relates generally to draper platforms. More particularly, it relates to draper platform suspensions.

BACKGROUND OF THE INVENTION

Draper platforms are elongate harvesting heads that are mounted on the front of agricultural harvesters. They typically include an elongate rigid frame with two guide wheels, one guide wheel located on either side of the frame. Draper platforms are supported on a feederhouse which extends forward from the front end of the agricultural harvester. Draper platforms are also supported on the guide wheels using springs. The springs are typically mechanical (such as leaf springs or coil springs) or hydraulic springs (i.e. hydraulic cylinders coupled to gas-charged accumulators).

In one prior art design, hydraulic springs included hydraulic cylinders coupled to a single gas-charged accumulator commonly coupled to all of the hydraulic cylinders, including cylinders the spring mount the frame to the guide wheels and to the feederhouse of the agricultural harvester.

The advantage of this arrangement is that by charging or discharging fluid from the single gas-charged accumulator, the forces applied by all the hydraulic springs could be simultaneously increased or decreased, proportionately and while the agricultural harvester was underway, traveling through the field harvesting crops.

By simultaneously extending all the springs, the draper platform is raised higher above the ground, yet does not changing its side-to-side orientation. This is useful when the draper platform travels over rough terrain to prevent injury to the draper platform by increasing its ground clearance.

One problem with this arrangement was that the entire draper platform tended to tilt to one side or the other. This was due to the cylinders being coupled to a common gas-charged accumulator. Rather than holding the draper platform at the same height above the ground across the entire width of the draper platform, the four hydraulic cylinders coupled in parallel to a single accumulator permitted hydraulic fluid to flow back and forth between the hydraulic cylinders when the center of gravity of the draper platform shifted to the left or to the right. This fluid flow tended to empty cylinders on the heavier side of the draper platform and fill the cylinders on the lighter side of the draper platform. As a result, one end of the draper platform could sink and perhaps dig into the ground while the other end of the draper platform could lift upward into the air.

What is needed, therefore, is a draper platform suspension using hydraulic springs that solved the problem of draper platform tilting due to hydraulic fluid flowing back and for the from side to side. A solution to this problem is described in claim 1 herein. The other claims describe other features of the machine that provide additional benefits.

SUMMARY OF THE INVENTION

A draper platform having an elongate, laterally extending frame has a suspension that includes two gauge wheels, with one gauge wheel located on the left side of the draper platform and the other gauge wheel located on the right side of the draper platform. The suspension further includes two hydraulic cylinders, one associated with each of the left and right side gauge wheels to support the frame on the gauge wheel. The suspension further includes two hydraulic cylinders disposed to support a central portion of the frame on the feederhouse, with one cylinder disposed to support the frame at the left side of the feederhouse and the other cylinder disposed to support the frame at the right side of the feederhouse.

A first hydraulic circuit includes a first gas-charged accumulator that is fluidly coupled to the left side hydraulic cylinder that supports the frame on the left side gauge wheel and is fluidly coupled to the left side hydraulic cylinder that supports the frame at the left side of the feederhouse. The first hydraulic circuit further includes a first hydraulic fluid flow control valve fluidly coupled to the first gas-charged accumulator and the left side hydraulic cylinders to control the flow of hydraulic fluid into and out of the two left side hydraulic cylinders and the first gas-charged accumulator independent of the flow of hydraulic fluid to and from the right side hydraulic cylinders.

A second hydraulic circuit includes a second gas-charged accumulator that is fluidly coupled to the right side hydraulic cylinder that supports the frame on the right side gauge wheel and is fluidly coupled to the right side hydraulic cylinder that supports the frame at the right side of the feederhouse. The second hydraulic circuit further includes a second hydraulic fluid flow control valve fluidly coupled to the second gas-charged accumulator and the right side hydraulic cylinders to control the flow of hydraulic fluid into and out of the two right side hydraulic cylinders in the second gas-charged accumulator independent of the flow of hydraulic fluid to and from the left side hydraulic cylinders.

At least two position sensors are provided, one sensor disposed on the left side of the frame and one sensor disposed on the right side of the frame. The two position sensors are disposed to sense the position of the header above the ground on the left side and the right side of the draper platform, respectively.

An electronic control circuit is provided that is coupled to the at least two position sensors and to the first and second hydraulic fluid flow control valves to connect and disconnect the left side hydraulic cylinders and the right side hydraulic cylinders to a source of hydraulic fluid under pressure, and to a hydraulic fluid reservoir.

The at least two position sensors may be located adjacent to the gauge wheel on the left side of the draper platform and adjacent to the gauge wheel on the right side of the draper platform.

The at least two position sensors may be located adjacent to the left side of the feederhouse and adjacent to the right side of the feederhouse.

Two additional position sensors may be provided such that there are two position sensors on the left side of the draper platform and two position sensors on the right side of the draper platform, all four of which are coupled to the electronic control circuit.

The electronic control circuit may be configured to sense signals provided by the at least two position sensors and to responsively and independently introduce additional hydraulic fluid into the first and second hydraulic circuits, and to responsively and independently remove hydraulic fluid from the first and second hydraulic circuits.

DETAILED DESCRIPTION OF THE PREFERRED EMBODIMENT

Figure 5:
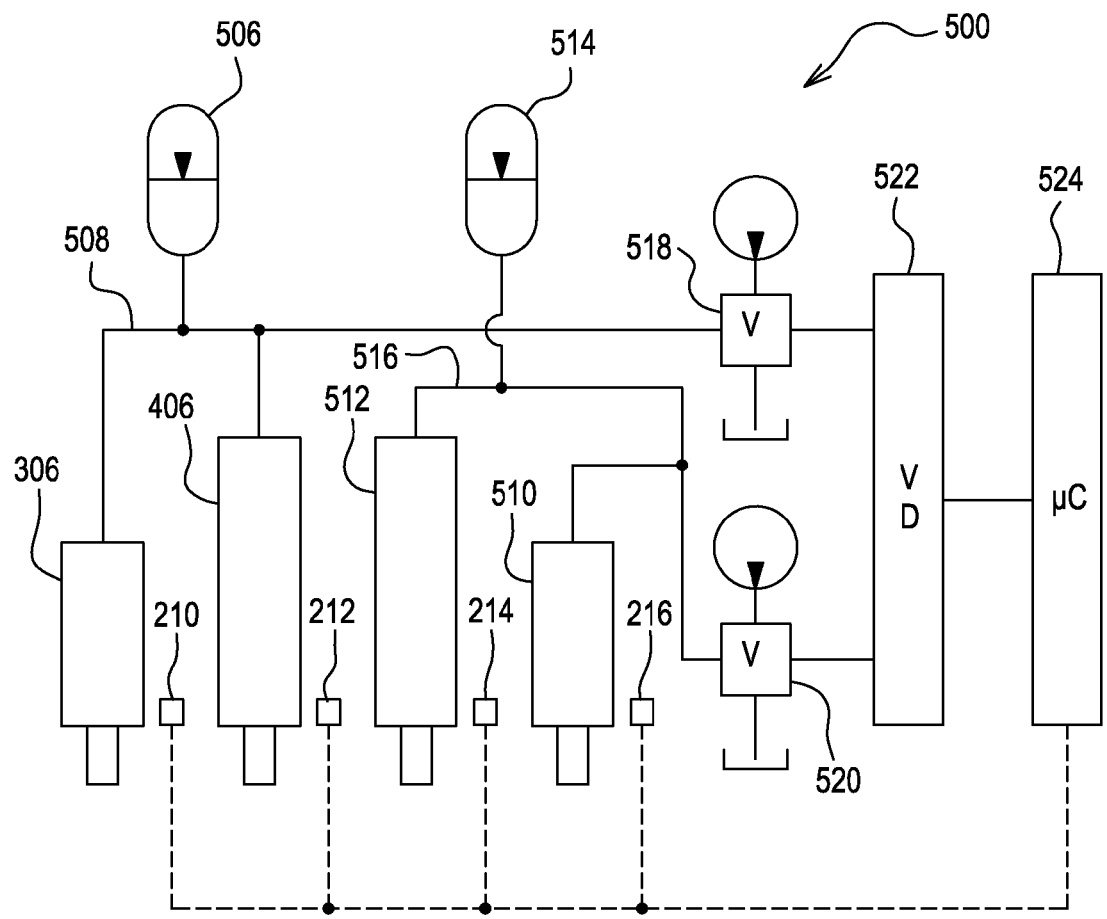
FIG. 5 is a schematic diagram of an electronic control circuit coupled to the hydraulic cylinders and height sensors.

In the description below, all the elements of the draper platform and suspension are from the prior art, with the exception of the hydraulic couplings, separate valving, position sensors, and their operation and connections to the electronic control unit and the programming of the electronic control unit that are best shown in FIG. 5.

Figure 1:
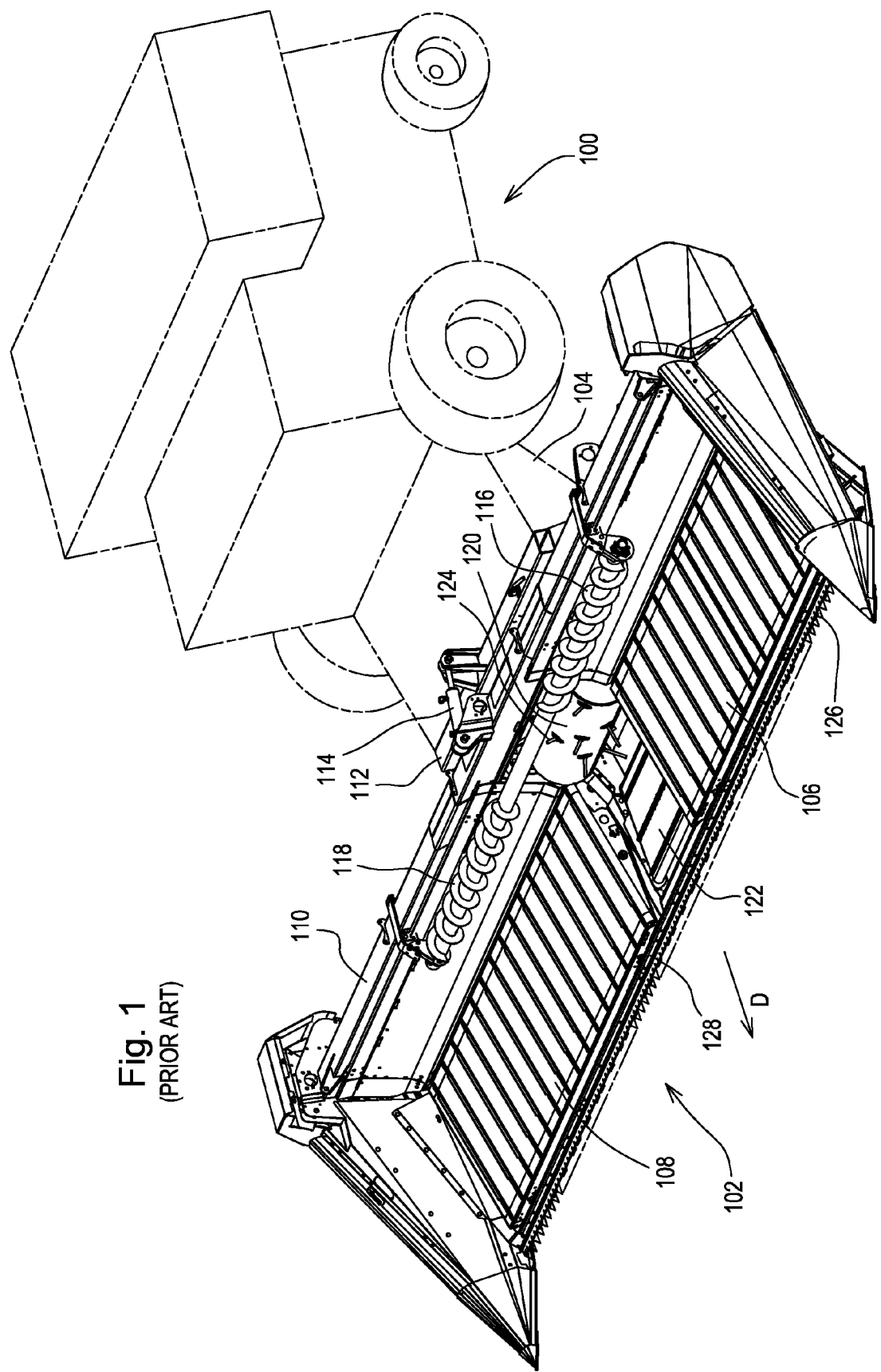
FIG. 1 is a perspective view of an agricultural harvester having a feederhouse and a draper platform with a suspension mounted on the feederhouse.

Referring to FIG. 1, an agricultural harvester 100 supports a draper platform 102 on the front end of a feederhouse 104 that extends forward in the direction of vehicular travel from the front of the agricultural harvester 100. Harvester 100 travels through a field in a direction "D" that is parallel to the longitudinal axis of the agricultural harvester 100 and perpendicular to the longitudinal extent of draper platform 102. Left and right side conveyor belts 106, 108 are supported on frame 110 of draper platform 102.

Draper platform 102 includes a subframe 112 that is supported directly on feederhouse 104, and in turn supports frame 110. Frame 110 can move relative to subframe 112 about a mechanical link 114, which is pivotally coupled to both frame 110 and subframe 112.

A reciprocating knife 126 is disposed at the leading lower edge of the draper platform 102, and extends across substantially the entire width of draper platform 102. Reciprocating knife 126 is supported on an elongate frame member 128 disposed immediately behind the reciprocating knife. Elongate frame member 128 extends across substantially the entire width of draper platform 102.

The reciprocating knife severs the stalks of crop plants adjacent to the ground permitting the upper portions of the crop plants to fall onto conveyor belts 106, 108 and to be conveyed to agricultural harvester 100.

Left and right side augers 116, 118, are disposed on the left and right sides of draper platform 102 and are rotated in a direction to draw cut crop material toward central aperture 120 in frame 110 of draper platform 102. Conveyor belts 106, 108 are similarly driven inwardly to carry cut crop material toward central aperture 120. Cut crop material that falls off conveyor belts 106, 108 or is carried to the center of draper platform 102 by left and right side augers 116, 118 is directed onto a center conveyor 122. Said her conveyor 122 conveys the cut crop material rearward underneath a conveyor drum 124, through central aperture 120 and into feederhouse 104. Once in feederhouse 104, the cut crop material is conveyed upward and rearward through feederhouse 104 into agricultural harvester 100 where it is threshed, separated, cleaned.

Figure 2:
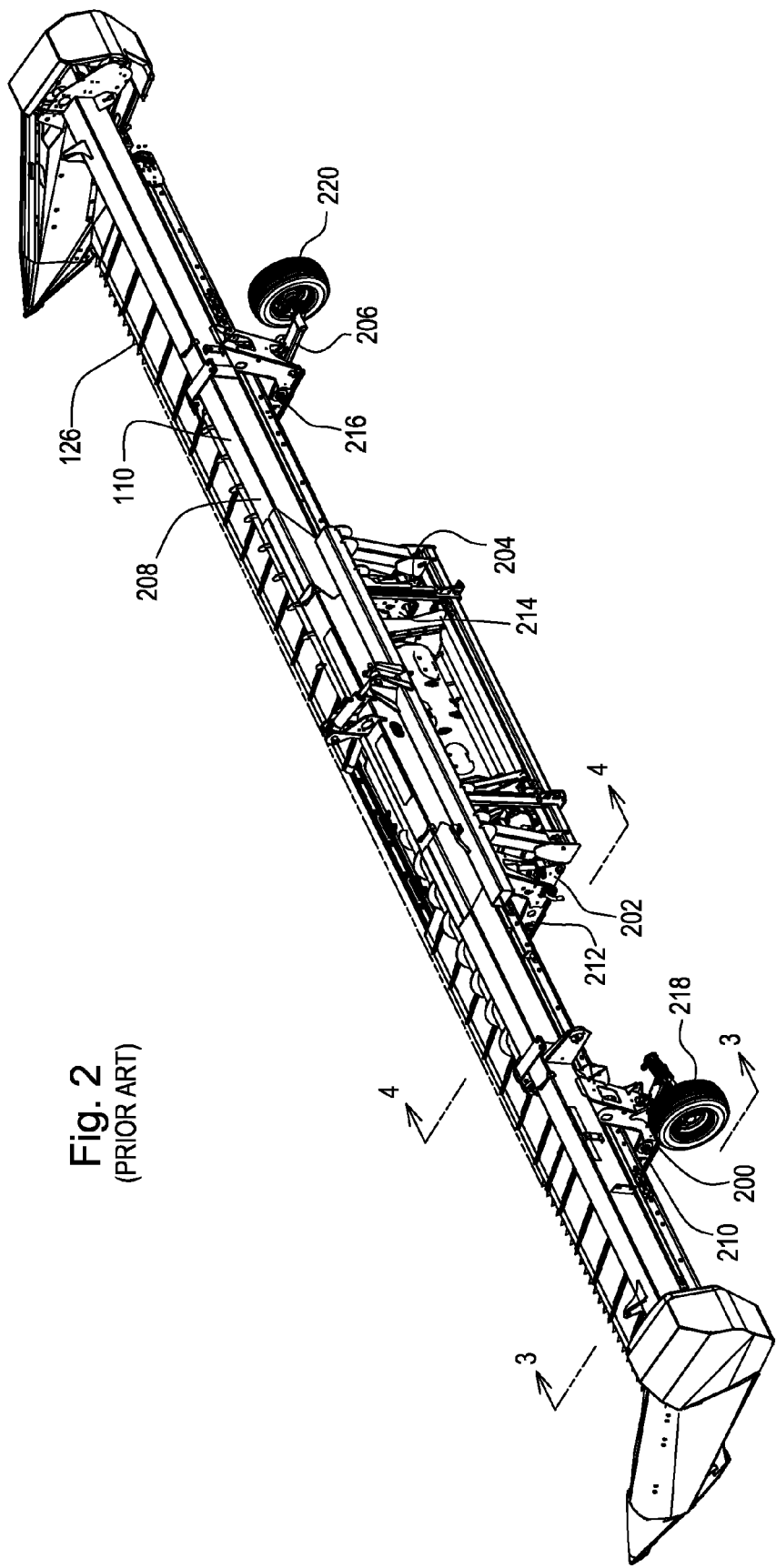
FIG. 2 is a reverse perspective view of the draper platform of FIG. 1.

Referring to FIG. 2, a plurality of frame members, here shown as four L-shaped frame members 200, 202, 204, 206, are coupled to elongate frame member 208 of frame 110. Elongate frame member 208 extends laterally substantially the entire width of draper platform 102. elongate frame member 208 forms the upper rear portion of draper platform 102. elongate frame member 208 is preferably tubular, either circular, oval, or polygonal in cross-section. L-shaped frame members 200, 202, 204, 206 are spaced apart across the back of draper platform 102. They are fixed at their upper ends to elongate frame member 208, extend downward therefrom, and extend forward to their lower ends, which are fixed to elongate frame member 128. Together, the four L-shaped frame members, elongate frame member 208, and elongate frame member 128 comprise frame 110 of draper platform 102.

Frame members 202 and 204 are located immediately adjacent to the left and right sides in feederhouse 104. Frame members 200 and 206 are located on the left and right sides (respectively) of feederhouse 104 approximately halfway between the feederhouse 104 and the left and right outer ends, respectively, of draper platform 102.

Four position sensors 210, 212, 214, 216 are disposed at L-shaped members 200, 202, 204, 206, respectively.

Position sensors 210, 216 are disposed to sense the position of the gauge wheels 218, 220 mounted on frame members 200, 206, respectively, with respect to frame 110. The gauge wheels rest upon the ground, and therefore the position sensors 210, 216 also indicate the position of frame 110 with respect to the ground.

Position sensors 212, 214 are disposed to sense the position of elongate members 400 (see FIG. 4) with respect to frame 110. Elongate members 400 (see FIG. 4) are coupled to subframe 112, which rests on feederhouse 104, therefore position sensors 212, 214 are also disposed to sense the position of frame 110 with respect to feederhouse 104.

A first gauge wheel 218 is supported on L-shaped frame member 200. Frame member 200 is disposed on the left side of draper platform 102. A second gauge wheel 220 is identically supported on L-shaped member 206. Frame member 206 is disposed on the right side of draper platform 102. These two gauge wheels 218, 220 provide partial support to draper platform 102 upon the ground as agricultural harvester 100 drives through the field. The gauge wheels 218, 220 are spring-loaded by hydraulic springs to provide some upward and downward movement of the gauge wheels with respect to frame 110 as the draper platform 102 harvests crop.

Figure 3:
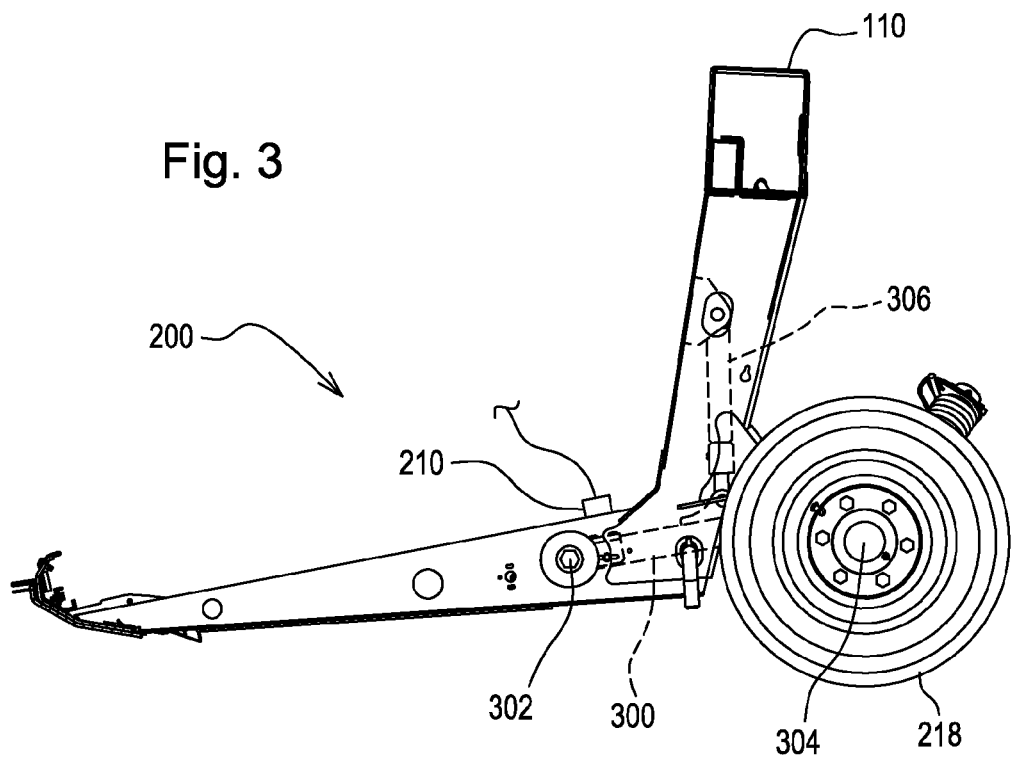
FIG. 3 is a longitudinal sectional view of the gauge wheel and its suspension located on the left side of the draper platform. It is taken at section line 3-3 in FIG. 2. The gauge wheel and suspension located on the right side of the draper platform are identically constructed but in mirror image relation.

Referring to FIG. 3, L-shaped frame member 200 is pivotally coupled to a forward end of elongate member 300 at pivot point 302. Elongate member 300 is constrained to pivot about pivot point 302. Elongate member 300 is further coupled to gauge wheel 218 such that gauge wheel 218 also pivots about pivot point 302. Gauge wheel 218 rests upon the ground during normal operation and rotates freely about its center point 304. Upward and downward movement of gauge wheel 218 is controlled by a hydraulic spring which includes hydraulic cylinder 306. Hydraulic cylinder 306 is coupled to and between elongate member 300 and L-shaped frame member 200 such that upward and downward movement of gauge wheel 218 with respect to frame 110 causes hydraulic cylinder 306 to extend and retract. In the preferred embodiment shown here, elongate member 300 is oriented generally horizontally and hydraulic cylinder 306 is oriented generally vertically. When hydraulic cylinder 306 extends, it pushes elongate member 300 and gauge wheel 218 downward with respect to frame 110. Since gauge wheel 218 rests upon the ground during normal operation, the extension of hydraulic cylinder 306 serves to lift frame 110 with respect to the ground. Similarly, retraction of hydraulic cylinder 306 lowers frame 110 with respect to the ground.

L-shaped frame member 206, and gauge wheel 220 are located on the right side of draper platform 102. They have the identical construction to that of member 200 and wheel 218 shown in FIG. 3, but in mirror image form. Sensor 216 is located on the right side of draper platform 102 as sensor 210 is on the left-hand side, but in mirror image relation. Similarly, an elongate member (not shown) that is mirror image identical to elongate member 300 couples gauge wheel 220 to L-shaped frame member 206 on the right hand side of draper platform 102 and to a hydraulic cylinder 510 that is a mirror image of hydraulic cylinder 306 in FIG. 3.

Figure 4:
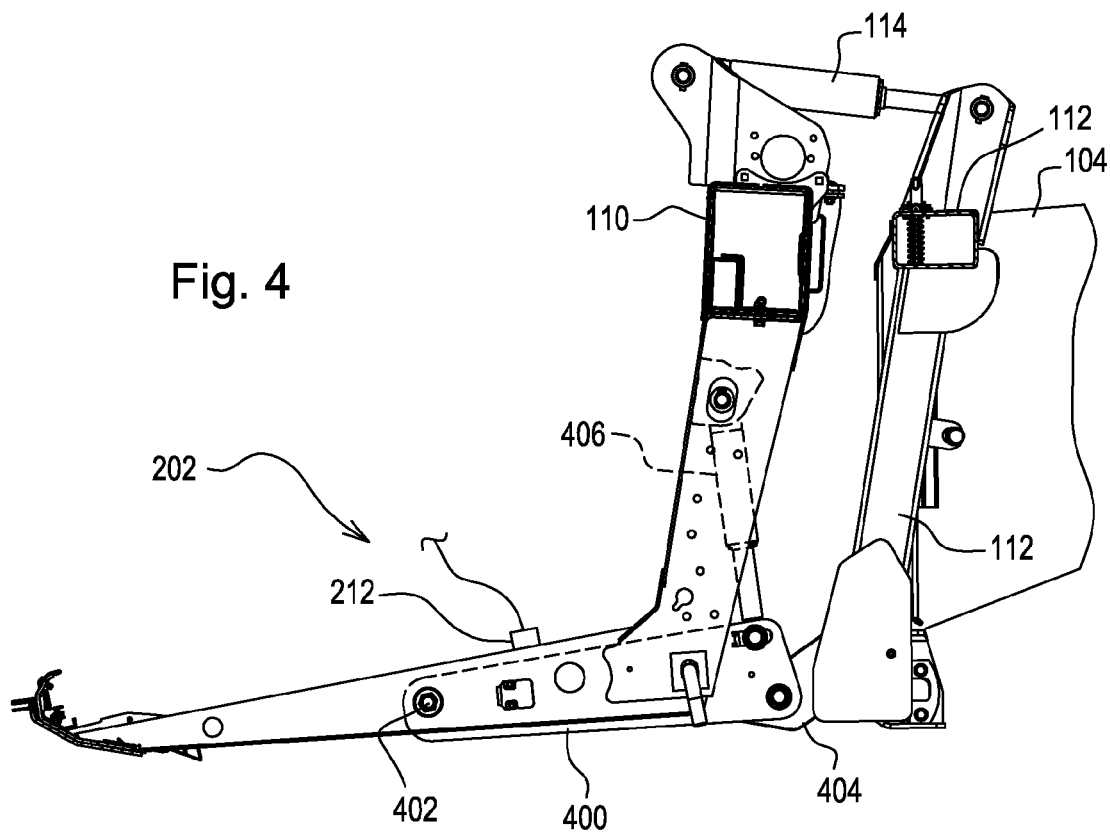
FIG. 4 is a longitudinal sectional view of the draper platform adjacent to the left side of the feederhouse. It is taken at section line 4-4 in FIG. 2. The draper platform adjacent to the right side of the feederhouse is identically constructed but in mirror image relation.

Referring to FIG. 4, L-shaped frame member 202 is pivotally coupled to a forward end of elongate member 400 at pivot point 402. Elongate member 400 is constrained to pivot about pivot point 402. Elongate member 400 has a coupling 404 that is pivotally coupled to subframe 112 at the left side of feederhouse 104. Subframe 112 is supported on feederhouse 104. Upward and downward movement of frame 110 with respect to subframe 112 is controlled by a hydraulic spring which includes hydraulic cylinder 406. Hydraulic cylinder 406 is coupled to and between elongate member 400 and L-shaped frame member 202 such that upward and downward movement of coupling 404 causes hydraulic cylinder 406 to extend and retract. In the preferred embodiment shown here, elongate member 400 is oriented generally horizontally and hydraulic cylinder 406 is oriented generally vertically. When hydraulic cylinder 406 extends, it pushes elongate member 400 downward with respect to frame 110, causing frame 110 to lift with respect to subframe 112, and therefore causing frame 110 to lift with respect to feederhouse 104 and with respect to the ground. Similarly, retraction of hydraulic cylinder 406 lowers frame 110 with respect to feederhouse 104 and therefore with respect to the ground.

L-shaped frame member 204, and an elongate member (not shown) identical to elongate member 400 are located on the right side of draper platform 102 and have the identical construction to that shown in FIG. 4, but in mirror image form. Sensor 214 is identically arranged on the right side of draper platform 102 as sensor 212 is on the left-hand side of draper platform 102, but in mirror image form. Similarly, an elongate member (not shown) that is mirror image identical to elongate member 400 couples frame 110 to L-shaped frame member 206 on the right hand side of draper platform 102 and to a hydraulic cylinder 512 that is a mirror image of hydraulic cylinder 406 in FIG. 4.

Referring to FIG. 5, an electronic control circuit 500 is illustrated that is coupled to first hydraulic circuit 502 and second hydraulic circuit 504.

First hydraulic circuit 502 includes hydraulic cylinders 306, 406, and gas-charged accumulator 506. The three elements of first hydraulic circuit 502 are coupled to a common hydraulic conduit 508 which permits hydraulic fluid pressure in these three elements to equalize by the free flow of fluid between the three elements. Thus, when the quantity of hydraulic fluid in first hydraulic circuit 502 is changed, the fluid pressure is communicated to hydraulic cylinders 306, 406 and two gas-charged accumulator 506. It is not communicated to hydraulic cylinders 510, 512 and gas-charged accumulator 514 disposed on the right hand side of draper platform 102.

Second hydraulic circuit 504 includes hydraulic cylinders 510, 512, and gas-charged accumulator 514. The three elements of second hydraulic circuit 504 are coupled to a common hydraulic conduit 516 which permits hydraulic fluid pressure in these three elements to equalize by the free flow of fluid between the three elements. Thus, when the quantity of hydraulic fluid in second hydraulic circuit 504 is changed, the fluid pressure is communicated to hydraulic cylinders 510, 512, and gas-charged accumulator 514. It is not communicated to hydraulic cylinders 306, 406 and gas charged accumulator 506 disposed on the left-hand side of draper platform 102.

Common hydraulic conduit 508 of first hydraulic circuit 502 is coupled to hydraulic valve 518 which is configured to control the flow of fluid from first hydraulic circuit 502 to a reservoir and from a source of high pressure hydraulic fluid to first hydraulic circuit 502. Common hydraulic conduit of second hydraulic circuit 504 is coupled to the hydraulic valve 520 which is configured to control the flow of fluid from second hydraulic circuit 502 to a reservoir and from a source of high pressure hydraulic fluid to second hydraulic circuit 504. This filling and emptying of each hydraulic circuit can occur independently of the other hydraulic circuit since the four hydraulic cylinders are not coupled to each other and to a common accumulator as they are in the prior art.

Hydraulic valves 518 and 520 are coupled to valve driver circuit 522, which generates signals of sufficient strength to operate the valves. Valve driver circuit 522 is in turn coupled to digital microcontroller 524. Digital microcontroller 524 is configured to signaled valve driver circuit 522 to apply valve driver signals to the valves. In this manner digital microcontroller 524 commands the opening and closing the valves 518, 520, which in turn fill and empty the first and second hydraulic circuits 502, 504 as commanded by microcontroller 524.

Digital microcontroller 524 is also coupled to position sensors 210, 212, 214, and 216. The position sensors transmit signals indicative of the position of draper platform 102 with respect to the ground (position sensors 210, 216), and with respect to feederhouse 104 (position sensors 212, 214).

Digital microcontroller 524 includes a ROM memory storing digital instructions that control the operation of the digital microcontroller. Digital microcontroller 524 also includes a RAM memory that uses to store operating parameters of the digital microcontroller during operation. All the operations described herein regarding the operation of the electronic control circuit 500 are controlled by digital microcontroller 524 which executes the instructions stored in ROM memory.

Digital microcontroller 524 is configured to periodically read the position signals provided by position sensors 210, 212, 214, 216. It is also configured to responsively determine from those signals whether digital microcontroller 524 should fill first and/or second hydraulic circuits 502, 504 with additional hydraulic fluid under pressure, or whether it should empty hydraulic fluid from first and/or second hydraulic circuits 502, 504 in order to maintain an appropriate position (e.g. height) of the draper platform 102.

Generally speaking, microcontroller 524 is configured to continuously compare the position signals on the left-hand side with desired position value for each of the position (i.e. height) sensors on the left side of the draper platform 102 and to enter a position (i.e. height) correction process whenever the comparison of the position signals on the left-hand side with the desired position values for the left-hand side sensors indicates that they differ by a predetermined amount.

For example, if microcontroller 524 determines from this comparison that the actual position signal is less than the desired position value, it is configured to automatically open hydraulic valve 518, connecting it to the source of hydraulic fluid under pressure. This permits hydraulic fluid to flow into the first hydraulic circuit 502, raising the pressure in hydraulic conduit 508, which causes hydraulic cylinders 306, 406 to extend. This cylinder extension, in turn, raises the left-hand side of draper platform 102. Microcontroller 524 repeats this measuring and filling process until the actual position signal it receives from sensors 210, 212 indicates the desired position value.

The same is true in the opposite sense. If microcontroller 524 determines from this comparison that the actual position signal is greater than the desired position value, it is configured to automatically open hydraulic valve 518, connecting it to the hydraulic fluid reservoir. This permits hydraulic fluid to flow out of the first hydraulic circuit 502, reducing the pressure in hydraulic conduit 508, which causes hydraulic cylinders 306, 406 to retract. This cylinder retraction, in turn, lowers the left-hand side of draper platform 102. Microcontroller 524 repeats this measuring and emptying process until the actual position signal it receives from sensors 210, 212 indicates the desired position value.

Microcontroller 524 is configured to continuously compare the position signals on the right hand side with the desired position value for each of the position (i.e. height) sensors on the right side of the draper platform 102 and to enter at position (i.e. height) correction process whenever the comparison of the position signals on the right hand side with the desired position values for the right hand side sensors indicates that they differ by a predetermined amount.

For example, if microcontroller 524 determines from this comparison that the actual position signal is less than the desired position value, it is configured to automatically open hydraulic valve 520, connecting it to the source of hydraulic fluid under pressure. This permits hydraulic fluid to flow into the first hydraulic circuit 504, raising the pressure in hydraulic conduit 516, which causes hydraulic cylinders 510, 512 to extend. This cylinder extension, in turn, raises the right-hand side of draper platform 102. Microcontroller 524 repeats this measuring and filling process until the actual position signal it receives from sensors 214, 216 equals the desired position value.

The same is true in the opposite direction. If microcontroller 524 determines from this comparison that the actual position signal is greater than the desired position value, it is configured to automatically open hydraulic valve 520, connecting it to the hydraulic fluid reservoir. This permits hydraulic fluid to flow out of the first hydraulic circuit 504, reducing the pressure in hydraulic conduit 516, which causes hydraulic cylinders 510, 512 to retract. This cylinder retraction, in turn, lowers the left-hand side of draper platform 102. Microcontroller 524 repeats this measuring and emptying process until the actual position signal it receives from sensors 214, 216 equals the desired position value.

Electronic control circuit 500 therefore independently controls the height of the left side of draper platform 102 and the right side of draper platform 102. It does this by independently raising and lowering the left and right hand sides of the draper platform 102. It does this by independently charging and discharging hydraulic fluid from independent hydraulic cylinder/gas-charged accumulator circuits. Since the circuits are independent from each other fluid is not transmitted from one side of the draper platform 102 to the other side when the center of gravity of the draper platform 102 shifts. Furthermore, if the center of gravity of the draper platform 102 shifts causing one side of the draper platform 102 sync downward under the added weight, that sunken side can be raised again to its correct height.

The invention claimed is:

1. In a draper platform (102) having an elongate, laterally extending frame (110), a suspension system comprises:
   first and second gauge wheels (218, 220), comprising one gauge wheel (218) located on the left side of the draper platform (102) and another gauge wheel (220) located on the right side of the draper platform (102);
   first and second hydraulic cylinders, wherein the first hydraulic cylinder (306) is mechanically coupled to the left side gauge wheel (218), and further wherein the second hydraulic cylinder (510) is mechanically coupled to the right side gauge wheel (220);
   third and fourth hydraulic cylinders disposed to support a central portion of the frame (110) on the feederhouse (104) wherein the third hydraulic cylinder (406) is disposed to support the frame at the left side of a feederhouse and the fourth hydraulic cylinder (512) is disposed to support the frame at the right side of the feederhouse;
   a first hydraulic circuit (502) comprising a first gas-charged accumulator (506) in fluid communication with the first hydraulic cylinder (306) and in fluid communication with the third hydraulic cylinder (406), a first hydraulic valve (518) in fluid communication with the first gas-charged accumulator (506) and the first and third hydraulic cylinders (306, 406), wherein the first hydraulic valve (518) is configured to control the flow of hydraulic fluid into and out of the first hydraulic circuit;
   a second hydraulic circuit (504) comprises a second gas-charged accumulator (514) in fluid communication with the second hydraulic cylinder (510) and in fluid communication with the fourth hydraulic cylinder (512), a second hydraulic valve (520) in fluid communication with the second gas-charged accumulator (514) and the second and fourth hydraulic cylinders (510, 512) wherein the second hydraulic valve (520 is configured to control the flow of hydraulic fluid into and out the second hydraulic circuit.

2. The suspension system of claim 1 further comprising at least two position sensors (210, 212, 214, 216), comprising at least one position sensor (210, 212) disposed on the left side of the frame (110) and at least another position sensor (214, 216) disposed on the right side of the frame (110), disposed to sense the position of the draper platform (102) above the ground on the left side and the right side of the frame (110), respectively.

3. The suspension system of claim 2, further comprising an electronic control circuit (500) coupled to the at least two position sensors (210, 212, 214, 216) to sense position signals received therefrom, and coupled to the first and second hydraulic valves (518, 522) to connect and disconnect the first, second, third, and fourth hydraulic cylinders (306, 510, 406, 512) to a source of hydraulic fluid under pressure and to a hydraulic fluid reservoir, respectively.

4. The suspension system of claim 3, wherein the at least two position sensors (210, 212, 214, 216) are located adjacent to the first gauge wheel (218) and adjacent to the second gauge wheel (220).

5. The suspension system of claim 3, wherein the at least two position sensors (210, 212, 214, 216) are located to sense the position of draper platform (102) with respect to the feederhouse (104) at the left side of the feederhouse (104), and are located to sense the position of the draper platform (102) with respect to the feederhouse (104) at the right side of the feederhouse.

6. The suspension system of claim 3, wherein the at least two position sensors (210, 212, 214, 216) include two position sensors (210, 212) disposed on the left side of the draper platform (102) and include two position sensors (214, 216) disposed on the right side of the draper platform (102).

7. The suspension system of claim 3, wherein the electronic control circuit (500) is configured to sense signals provided by the at least two position sensors (210, 212, 214, 216), to determine an appropriate amount of hydraulic fluid based upon those signals, to responsively introduce additional hydraulic fluid into the first and second hydraulic circuits (502, 504) if the position of the draper platform (102) is too low, and to responsively remove hydraulic fluid from the first and second hydraulic circuits (502, 504) if the position of the draper platform (102) is too high.

* * * * *